United States Patent [19]

Neuman

[11] Patent Number: 5,232,062

[45] Date of Patent: Aug. 3, 1993

[54] VISCOUS DAMPING APPARATUS FOR DAMPING LOAD CELLS OF WEIGHING DEVICES

[75] Inventor: Eli Neuman, Magdiel, Israel

[73] Assignee: Tadea Limited, Canoga Park, Calif.

[21] Appl. No.: 775,411

[22] Filed: Oct. 15, 1991

[51] Int. Cl.$^5$ ............................................. G01G 23/08
[52] U.S. Cl. .................................................... 177/187
[58] Field of Search ................................. 177/184–188

[56] References Cited

U.S. PATENT DOCUMENTS

| | | | |
|---|---|---|---|
| 1,837,817 | 12/1931 | Hallead | 177/184 |
| 3,789,873 | 2/1974 | Westwood. | |
| 3,842,924 | 10/1974 | Schmitter et al. | 177/184 |
| 3,876,017 | 4/1975 | Ziefle | 177/184 X |
| 3,982,738 | 9/1976 | Meier et al. | 177/184 X |
| 3,985,190 | 10/1976 | Kammerer et al. | 177/184 |
| 3,991,841 | 11/1976 | Crawley | 177/184 X |
| 4,009,604 | 3/1977 | Taber et al. . | |
| 4,201,081 | 5/1980 | Bonomo. | |
| 4,428,444 | 1/1984 | Whittaker et al. | 177/187 |
| 4,440,250 | 4/1984 | Sigg | 177/187 |
| 4,479,561 | 10/1984 | Feinland et al. . | |
| 4,848,495 | 7/1989 | Hayashi | 177/187 |

*Primary Examiner*—George H. Miller, Jr.
*Attorney, Agent, or Firm*—Thomas I. Rozsa; Dong Chen

[57] ABSTRACT

The present invention is a viscous damping apparatus for damping mechanical shocks discharged on an object. It comprises a container having an inner chamber which has a flat bottom surface, a damping member having a flat lower surface, and means for suspending the damping member such that its flat lower surface is positioned parallel and very close to the flat bottom surface of the inner chamber of the container. The space between the flat lower surface of the damping member and the flat bottom surface of the inner chamber of the container is very narrow and is filled with a body of viscous fluid. When the damping member vibrates and causes its flat lower surface to move toward the flat bottom surface of the inner chamber of the container, the viscous fluid is compressed, which in turn creates an extremely strong resistance force on the damping member that effectively damps the vibration of the damping member. A preferred embodiment of the present invention viscous damping apparatus is incorporated into a weighing device to damp the vibration of the load cell of the weighing device.

7 Claims, 2 Drawing Sheets

VISCOUS DAMPING APPARATUS FOR DAMPING LOAD CELLS OF WEIGHING DEVICES

BACKGROUND OF THE INVENTION

1. Field of the Invention

The present invention relates generally to the field of viscous damping apparatus. More particularly, the present invention relates to viscous damping apparatus incorporated with load cells of weighing devices.

2. Description of the Prior Art

The following most pertinent prior art patents have been uncovered and deemed to be relevant to the present invention:

1. U.S. Pat. No. 4,479,561 issued to Feinland et al. on Oct. 30, 1984 for "Weighing Cell" (hereafter referred to as the "Feinland patent").
2. U.S. Pat. No. 4,201,081 issued to Bonomo on May 6, 1980 for "Pressure Responsive Sensing Device" (hereafter referred to as the "Bonomo patent").
3. U.S. Pat. No. 4,009,604 issued to Taber et al. on Mar. 1, 1977 for "Pressure Converter For Calibrating Gauges" (hereafter referred to as the "Taber patent").
4. U.S. Pat. No. 3,991,841 issued to Crawley on Nov. 16, 1976 for "Weighing Device" (hereafter referred to as the "Crawley patent").
5. U.S. Pat. No. 3,982,738 issued to Meier et al. on Sep. 28, 1976 for "Dash-Pot Arrangement For Balance" (hereafter referred to as the "Meier patent").
6. U.S. Pat. No. 3,876,017 issued to Ziefle on Apr. 8, 1975 for "Scale Construction" (hereafter referred to as the "Ziefle patent").
7. U.S. Pat. No. 3,789,873 issued to Westwood on Feb. 5, 1974 for "Pneumatic Pressure Transmitting Device" (hereafter referred to as the "Westwood patent").
8. U.S. Pat. No. 3,842,924 issued to Schmitter et al. on Oct. 22, 1974 for "Damping Arrangement For A Balance" (hereafter referred to as the "Schmitter patent").
9. U.S. Pat. No. 1,837,817 issued to Hallead on Dec. 22, 1931 for "Damping Mechanism For Scales" (hereafter referred to as the "Hallead patent").

The Hallead patent (1931) discloses a damping mechanism for a scale. The Hallead patent damping apparatus comprises an inner cylinder 15 having an inner chamber for containing viscous fluid, and an outer cylinder 1 providing an annular outer chamber for by-passing the viscous fluid. The inner cylinder 15 has several upper sidewall apertures 21 and a lower bottom opening for interchanging the viscous fluid with the annular outer chamber. A piston 14 is assembled inside the inner chamber and connected to the lever 10 of the scale by a piston rod 12. When the piston 14 moves up and down inside the inner chamber, its movement is dampened by the vicious fluid, which in turn is forced to pass through the by-pass annular outer chamber. The Hallead patent provides one of the basic models of the piston-cylinder type viscous damping apparatus for scales and balances. For the piston-cylinder type damping apparatus to function properly, it is essential to have the piston well conform with the cylinder, i.e., the diameter of the piston plate should be very close to the diameter of the inner chamber of the cylinder.

The Schmitter patent (1974) discloses a damping arrangement for a balance. The Schmitter patent damping apparatus comprises two identical dashpots 9a and 9b. The dashpot 9a includes a glass tube 19 and a plunger 12 carrying two annular piston rings 14, which are free to move radially into direct contact with the inner surface of the glass tube 19. The arrangement of the piston rings 14 regulates the air passage between the inside and outside of the glass tube for providing pneumatic damping to the plunger 12, which is further connected with the balance arm.

The Westwood patent (1974) discloses a pneumatic pressure transmitting device utilizing a damping apparatus for damping the movement of the cover 4 of its pneumatic pressure chamber 1. The Westwood patent damping apparatus comprises an annular damping plate submerged in oil 16 contained at the bottom of a cup 14.

The Ziefle patent (1975) discloses a scale construction utilizing a piston-cylinder type damping apparatus. The Ziefle patent piston-cylinder type damping apparatus comprises a cylinder 1 containing oil 5 and a piston 7 connected with a balance lever 12 through a piston rod 8. The diameter of the piston 7 is slightly smaller than the inner diameter of the cylinder 1 for providing proper damping.

The Meier patent (1976) discloses a dashpot arrangement for a balance. The Meier patent damping apparatus comprises a piston 24 which is immersed in a body 10 of oil enclosed in a cylindrical vessel 12. The diameter of the piston 24 is, again, slightly smaller than the inner diameter of the cylindrical vessel 12 for providing proper damping.

The Crawley patent (1976) discloses a weighing device having a damping apparatus. The Crawley patent damping apparatus comprises a container 9 containing viscous fluid, and a rod 4 extending into the container 9. A washer 10 is fitted at the bottom of the rod 4 and submerged in the viscous fluid for damping the movement of the rod 4. The size of the washer 10 does not match the size of the inner chamber of the container 9.

The Taber patent (1977) discloses a pressure converter which can be used between a load cell and a gauge. The Taber patent apparatus is not a damping apparatus for the load cell, but rather a calibrating apparatus for the gauge.

The Bonomo patent (1980) discloses a pressure responsive sensing device. The Bonomo patent apparatus is merely a pressure transducer.

The Feinland patent (1984) discloses a weighing cell having a platform 3, a self-contained base 4 and a load cell 1 operatively connected therebetween. Shims 11 and 14 are provided on the upper and lower surfaces of the load cell 1 to maintain pre-determined partial gaps between the load cell 1, the platform 3 and the base 4.

Most of the prior art patents utilize piston-cylinder type viscous damping apparatus for damping the weight head or load cells of scales. The general features of such prior art damping apparatus are illustrated in FIG. 1 at 10. The damping apparatus 10 is used for damping the vibration of an external object such as a load cell 11. It comprises a cylindrical shaped container 12 containing a body of viscous fluid 14. A damping plate 16 is positioned in the middle of the container and connected to the load cell 11 through a piston rod 18. To provide adequate damping effect, the damping plate 16 of this prior art piston-cylinder type damping apparatus 10 has to match the inner circumferential size of the vicious fluid container 12, which often results in inaccurate reading on the load cell 11 because of the friction due to the physical contact between the damping plate 16 and the inner sidewall of the viscous fluid container 12. It is desirable to have a damping device, wherein the contact between the damping plate and the inner sidewall of the viscous fluid container is completely avoided; but which still provides adequate damping effect.

SUMMARY OF THE INVENTION

The present invention is a viscous damping apparatus for damping load cells of weighing devices.

Generally, the present invention comprises a container containing viscous fluid. A damping plate is horizontally disposed and slidably supported within the container. The damping plate is connected to an external member through a vertical shaft, where the external member may be subject to sudden impacting forces or shocks. The damping plate is surrounded by the viscous fluid contained in the container and positioned very close to the bottom of the container. When a sudden impacting force or shock is applied on the external member, the damping plate will move down toward the bottom of the container, which will force the viscous fluid flow away from the narrow area between the damping plate and the bottom of the container. Since the viscous fluid creates viscous force on the damping plate, the vibrational movement of the damping plate and the external member is properly damped. Since the viscous force is created by the viscous fluid flowing away from the narrow area between the damping plate and the bottom of the container, it is not necessary to have the circumferential edge of the damping plate substantially conformed with the inner surface of the sidewall of the container, such as those found in many piston-cylinder arrangements of the conventional damping apparatus.

Particularly, the present invention is incorporated with weighing devices. In a weighing device, sudden forces or shocks impacted on its load cell will cause the load cell to vibrate undesirably. In one embodiment of the present invention, the load cell of the weighing device is attached to the damping plate of the viscous damping apparatus, so that the vibrational movement of the load cell is properly damped by the viscous damping apparatus. Therefore a particular application of the present invention is the viscous damping apparatus for weighing devices for damping the vibration of the load cells upon impacting forces or shocks.

It has been discovered, according to the present invention, that when a damping plate is positioned very close to the bottom of a viscous fluid container, the viscous fluid will create a significant resistance force onto the damping plate if the damping plate is moved closer to the bottom of the container, because it forces the viscous fluid to flow away from the narrow area between the damping plate and the bottom of the container.

It has also been discovered, according to the present invention, that particularly in weighing devices, the prior art piston-cylinder type damping apparatus often fail to provide sufficient damping because the amplitude of the oscillation of a load cell in a weighing device is typically very small.

It has further been discovered, according to the present invention, that unlike the prior art piston-cylinder damping apparatus, the damping plate positioned very close to the bottom of the viscous fluid container works very well for the small scale movement of the load cell in the weighing devices, since the damping plate can be positioned very close to the bottom of the container without the risk of contacting the bottom of the container, but still subject to sufficient damping force created by the viscous fluid.

It has been additionally discovered, according to the present invention, that since the viscous fluid can create sufficient damping forces on the damping plate positioned very close to the bottom of the container of the viscous fluid, it is not necessary to have the outer circumference of the damping plate conformed with the interior surface of the container.

It is therefore an object of the present invention to provide a new type of viscous damping apparatus superior to the traditional piston-cylinder type of viscous damping apparatus.

It is a further object of the present invention to provide a viscous damping apparatus, wherein a damping plate is positioned very close to the bottom of a viscous fluid container, such that when the damping plate is moved closer to the bottom of the container, the viscous fluid will create a great resistance force against the damping plate, because the damping plate forces the viscous fluid to flow away from the narrow area between the damping plate and the bottom of the container.

It is an additional object of the present invention to provide a viscous damping apparatus particularly for damping load cells of weighing devices, wherein the amplitude of the oscillation of the load cell is typically very small, since traditional piston-cylinder type damping apparatus do not provide sufficient damping to the load cell.

It is a further object of the present invention to provide a viscous damping apparatus, wherein the possibility of having the damping plate contact the inner sidewall of the viscous fluid container is eliminated.

It is also an object of the present invention to provide a viscous damping apparatus for damping vibrations of objects which move in very small displacements.

It is another object of the present invention to provide a viscous damping apparatus, which eliminates the small amplitude oscillation of an object in a very short period of time.

It is another object of the present invention to provide a viscous damping apparatus incorporated with a weighing device, which substantially increases the working life of the weighing device.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
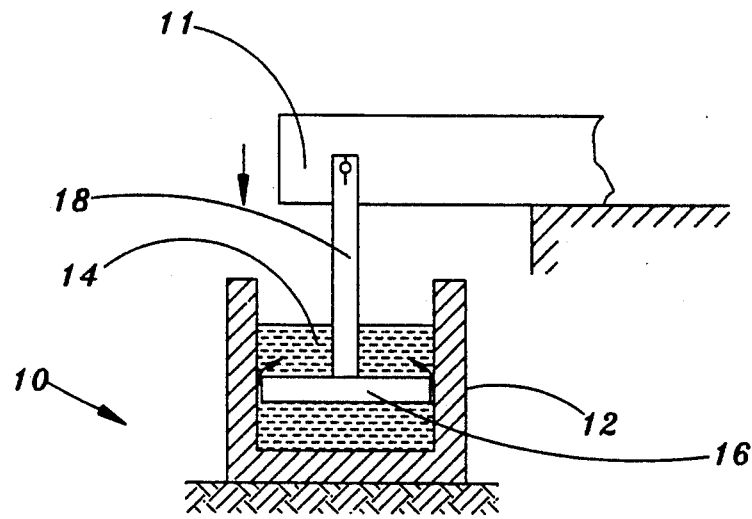
FIG. 1 is an illustrative diagram of the essential features of a prior art piston-cylinder type viscous damping apparatus.
Figure 2:
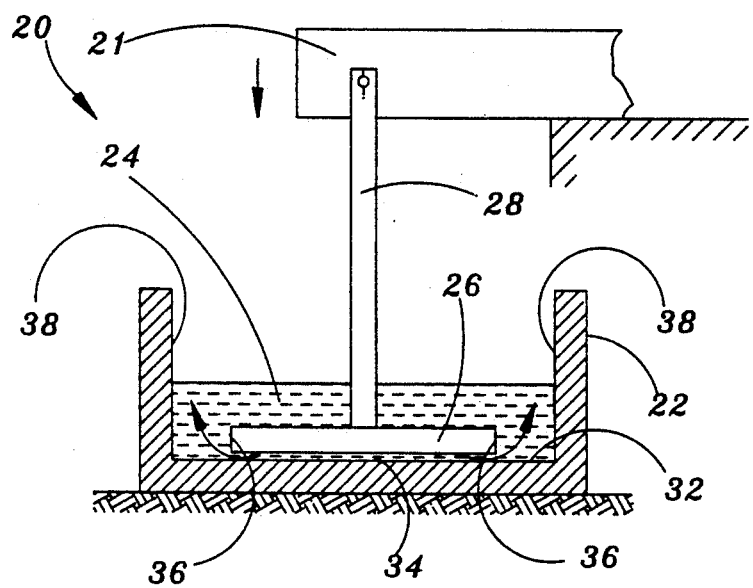
FIG. 2 is an illustrative diagram of the essential features of the present invention viscous damping apparatus.

Referring to FIG. 2, shown at 20 there is the present invention viscous damping apparatus for damping the vibration of an external object such as a load cell 21, which may be subject to sudden impacting forces or shocks. The present invention viscous damping apparatus 20 essentially comprises a container 22 containing viscous fluid 24. A damping plate 26 is horizontally disposed and slidably supported within the container 22 by a damping plate tie bar 28, and connected to the load cell 21. The damping plate 26 is submerged in the viscous fluid 24 contained in the container 22, and positioned very close to the bottom 32 of the container 22, which leaves a very narrow space 34 between the damping plate 26 and the bottom 32 of the container 22. When a sudden impacting force or shock is applied on the load cell 21, the damping plate 26 will move downwardly toward the bottom 32 of the container 22, which will force the viscous fluid 24 to flow away from the narrow space 34 between the damping plate 26 and the bottom 32 of the container 22. Since the viscous fluid 24 has to be compressed away through that very narrow space 34, it creates a great resistance on the damping plate 26. Consequently, the vibrational movement of the damping plate 26, and in turn the load cell 21, is properly damped. Since the damping force is created by the viscous fluid flowing away from the narrow space 34 between the damping plate 26 and the bottom 32 of the container 22, it is not necessary to have the circumferential edge 36 of the damping plate 26 substantially conformed with the inner surface 38 of the sidewall of the container 22, such as those found in the piston-cylinder arrangement of the conventional damping apparatus 10 shown in FIG. 1.

Figure 3:
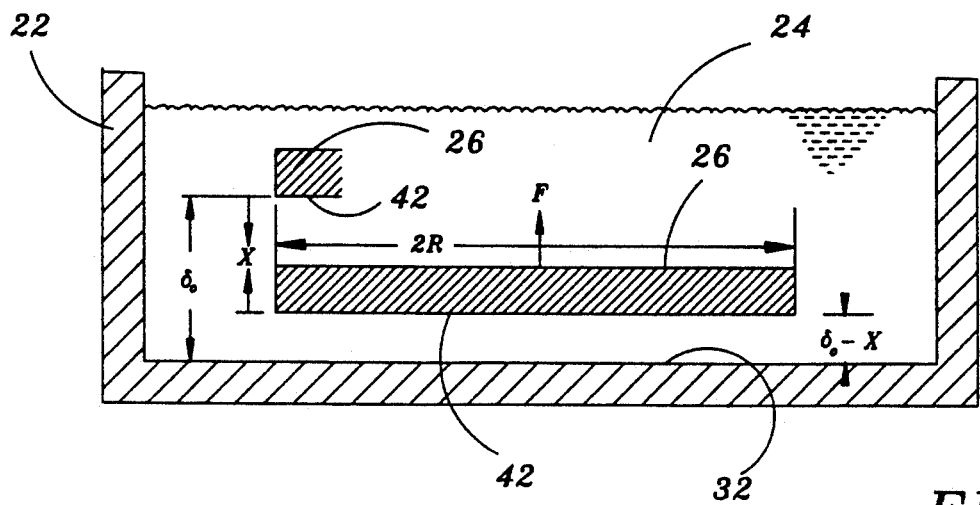
FIG. 3 is an enlarged view of the present invention viscous damping apparatus showing the detailed position of the damping plate relative to the bottom of the viscous fluid container of the present invention viscous damping apparatus.

The resistance created by the viscous fluid 24 and exerted on the damping plate 26 in the present invention viscous damping apparatus 20 is much greater than that in the prior art piston-cylinder type damping apparatus 10. Referring to FIG. 3, assuming that the damping plate 26 is a round disc shaped plate, the damping force F is:

$$F = K \frac{R^4 \mu}{(\delta_0 - x)^3} S \qquad [1]$$

where:

F is the damping force;
K is a constant;
R is the radius of the damping plate 26;
$\mu$ is the viscosity of the viscous fluid 24;
$\delta_0$ is the initial distance between the lower surface 42 of the damping plate 26 and the bottom 32 of the container 22;
X is the momentary distance between the current location of the damping plate 26 and its initial position $\delta_0$; and
S is the speed of the damping plate 26.

From Equation [1] it can be seen that the damping force F is proportional to the reverse of the cube of the momentary distance $(\delta_0 - x)$ between the lower surface 42 of the damping plate 26 and the bottom 32 of the container 22. In Formula [1] $KR^4$ may be substituted by $K'A^2$, where K' is another proportional constant, A is the area of the lower surface of the damping plate which is proportional to $R^2$, so that Formula [1] is generally suitable for damping plates with other shapes. Since $(\delta_0 - X)$ is a very small quantity, the damping force F is very large, and increases dramatically as the damping plate 26 moves closer to the bottom 32 of the container 22.

Figure 4:
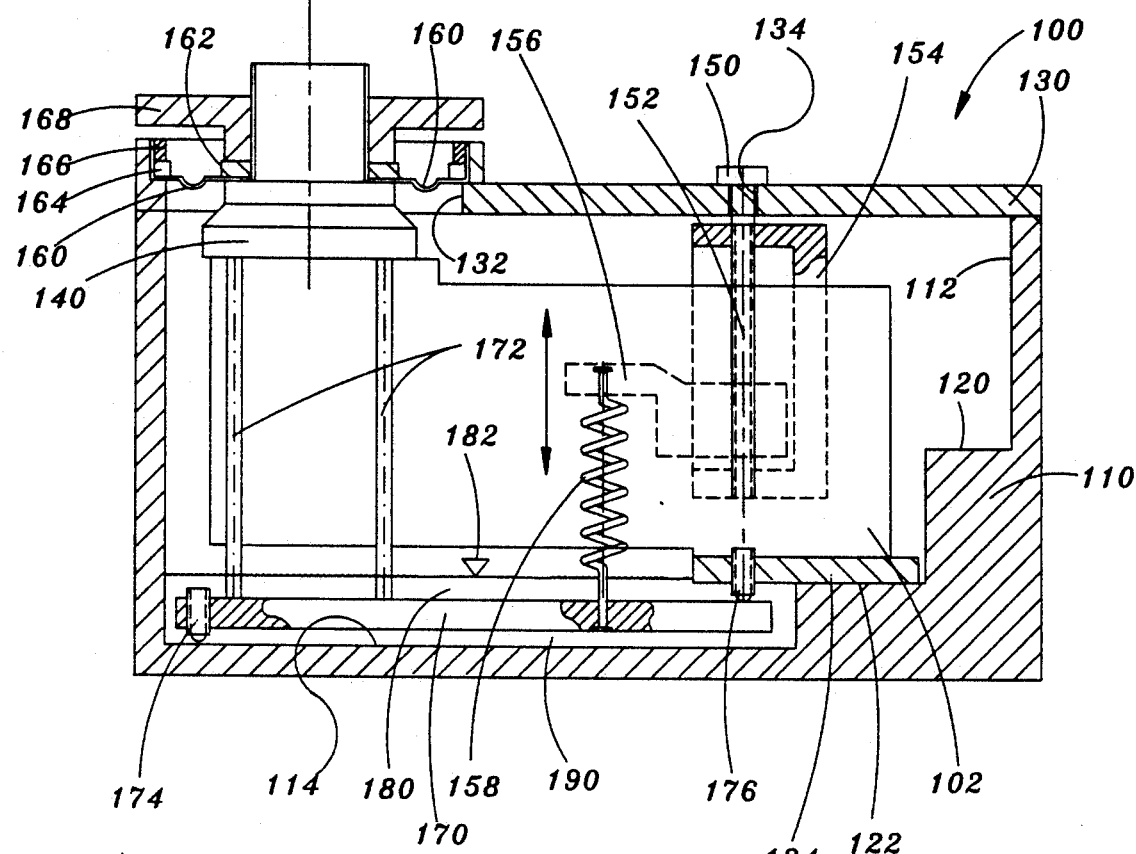
FIG. 4 is an illustrative diagram of one of the preferred embodiments of the present invention viscous damping apparatus, which is incorporated into a compact weighing device for damping the vibration of the load cell of the weighing device.

One of the numerous possible embodiments of the present invention is incorporated in a weighing device 100. Shown in FIG. 4, the weighing device 100 has a generally rectangular shaped housing 110 that has a hollow chamber 112. Inside the hollow chamber 112 there are a couple of steps 120 and 122, which provide two possible mounting areas for a load cell mounting plate 124, which in turn mounts a load cell 102 to the housing 110.

A cover 130 is placed on top of the housing 110. The cover 130 has a large opening 132 at one location. A loading adaptor 140 is placed on top of the load cell 102 and extends through the large opening 132 of the top cover 130. The cover 130 also has a small opening 134 at another location. An access plug 150 is positioned through the small opening 134 of the top cover 130 and connected to an adjusting screw 152 that is located inside the hollow chamber 112.

A circular seal 160 is placed around the loading adaptor 140 and covers the large opening 132 of the top cover 130. An internal circular washer 162 and an external circular washer 164 are placed on the circular seal. The seal is held in position by an external seal holding nut 166. A seal protective cover 168 is provided for protecting the seal 160.

A damping plate 170 is positioned very close to the bottom 114 of the housing 110 and submerged in a body of viscous fluid 180. The damping plate 170 is attached with the loading adaptor 140 and the load cell 102 through two tie bars 172, so that the loading impact exerted on the loading adaptor 140 and transferred to the load cell 102 is also transferred to the damping plate 170. Overload stop screws 174 and 176 are mounted on the upper and bottom surface of the damping plate respectively. Positive overload stop screw 174 will prevent the damping plate 170 from contacting the bottom 114 of the housing 110, and negative overload stop screw 176 will prevent the damping plate 170 from contacting the load cell mounting plate 124.

The load cell 102 is assembled with a tare offset mechanism. The tare offset mechanism for the load cell 102 includes the tare offset adjustment screw 152 and its access plug 150, a tare offset screw holder 154 which is mounted inside the inner chamber 112 of the housing 110 and holds the tare offset screw 152, a tare offset slide 156 threaded on the tare offset screw 152 and a tare offset spring 158. The tare offset slide 156 is also engaged with the load cell 102, such that by turning the tare offset screw 152, the vertical position of the load cell 102 is adjusted, which in turn adjusts the tension of the tare offset spring 158, so that the tare measured by the load cell 102 can be properly offset.

The unique feature of the damping apparatus of this weighing device is that the damping plate 170 is positioned very close to the bottom 114 of the housing 110. The clearance 190 between the bottom surface of the damping plate 170 and the bottom 114 of the housing 110, in one preferred embodiment of the present invention, is only sixty mils (60 mils). Of course this is only a preferred value. The range of the clearance 190 may be up to four-hundred mils (400 mils). Filled in the space between the bottom surface of the damping plate 170 and the bottom 114 of the housing 110 is a very thin layer of viscous fluid. When a loading shock is transferred to the load cell 102 and causes the load cell 102 to vibrate, the initial movement of the damping plate 170 is a downward movement. As the damping plate 170 moves downwardly, it compresses the very thin layer of viscous fluid which is located in the space between the bottom surface of the damping plate 170 and the bottom 114 of the housing 110. The viscous fluid in turn creates an extremely strong resistance force on the damping plate 170. This process effectively damps the oscillation of the load cell 102.

This type of weighing device is particularly useful in the high speed packing industry. For example, in a high speed automatic breakfast cereal box packing line, an empty box is placed on the load adaptor, and an automatic dispensing machine will dispense cereal into the box. The load cell must measure the weight quickly in order to control the automatic dispensing machine to cause it to stop dispensing cereal once the correct weight is reached. However, the drop shock of the cereal discharged on the load adaptor will cause the load cell to vibrate, which slows down the weighing process and makes the weighing inaccurate. With the present invention viscous damping apparatus installed, the vibration of the load cell is quickly damped in less than a fraction of a second.

Figure 5:
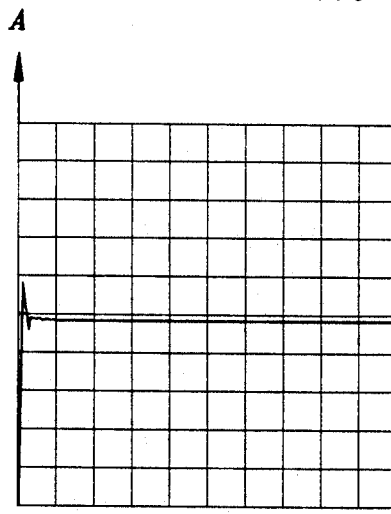
FIG. 5 is an illustrative diagram showing the vibrational amplitude of the load cell when it is properly damped by the present invention viscous damping apparatus.
Figure 6:
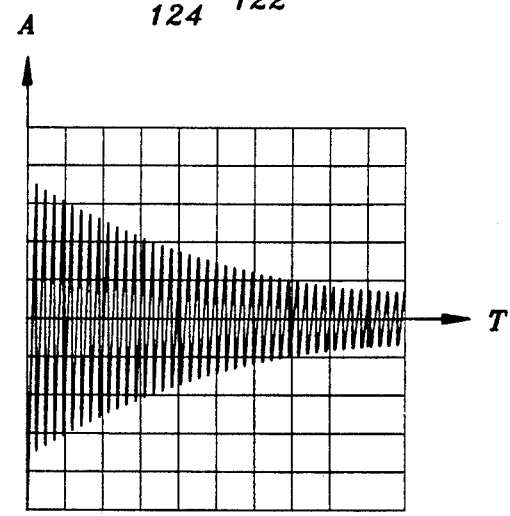
FIG. 6 is an illustrative diagram showing the vibrational amplitude of the load cell without damping.

A particular embodiment of the weighing device has been a test to determine the effectiveness of the present invention viscous damping apparatus. This particular model of the weighing device has a 3 kg capacity. An approximately one inch diameter steel ball, having an approximate weight of 70 gm, is dropped from a height of about 700 mm onto the load adaptor, which is about 150 mm from the mounting point of the load cell. The vibration of the load cell is recorded and diagramed in FIGS. 5 and 6, where the vertical dimensions represent the amplitude of the vibration of the load cell, and the horizontal dimensions represents the setting time of the load cell. The vibration of the load cell without damping is shown in FIG. 6, and the vibration of the load cell with damping is shown in FIG. 5. The amplitudes of the initial vibration of the load cell, which represent the strength of the original shock transferred to the load cell, are the same in both figures. However, without the damping provided by the present invention viscous damping apparatus, the amplitude of the vibration of the load cell drops very slowly and the setting time is more than 2 seconds, whereas with the damping provided by the present invention viscous damping apparatus, the amplitude of the vibration of the load cell drops almost at once and the setting time is less than 1/10 second.

It will be appreciated that the present invention viscous damping apparatus may be incorporated into many other types of weighing devices, no matter how simple or complex. For example, it may be incorporated into a simple balance to damp the vibration of the balance bar. It may be also incorporated into many other types of mechanical devices where the vibration of a componential member needs to be damped. It will also be appreciated that one of the unique features of the present invention is to have the damping plate positioned very close to the bottom of the viscous fluid container, such as within 400 mils, preferably 60 mils.

The present invention viscous damping apparatus has many advantages over the traditional viscous damping apparatus, including: (a) it is particularly effective for damping load cells of weighing devices, where the amplitude of the oscillation of the load cell is very small; (b) it substantially increases the working life of the load cell of the weighing device; (c) it eliminates the possibility of having the damping plate contact the inner sidewall of the viscous fluid container; (d) it provides an adequate viscous damping apparatus for damping the vibration of some objects which vibrate in very small displacements; and (e) it damps oscillations with very small amplitude oscillation in a very short period of time. In addition, the present invention viscous damping apparatus requires neither complicated fluid-tight assemblies, nor heavy and expensive components. It is very cost effective, and very easy to install, use and maintain.

Defined in detail, the present invention is a viscous damping apparatus for damping mechanical shocks discharged on an object, comprising: (a) a container having a circumferential sidewall and a bottom, the circumferential sidewall having an inner surface, and the bottom having a substantially flat upper surface, such that the inner surface of the circumferential sidewall and the substantially flat upper surface of the bottom form a resevoir; (b) a damping member having a circumferential side surface and a substantially flat lower surface; (c) the circumferential dimension of said damping member being smaller than the circumferential dimension of said reservoir; (d) means for attaching said damping member to said object and suspending said damping member in said reservoir, such that said circumferential side surface of said damping member is clear from said inner surface of said circumferential sidewall of said container, but said substantially flat lower surface of said damping member is positioned parallel and very close to said substantially flat upper surface of said bottom of said container, which leaves a very narrow space between said substantially flat lower surface of said damping member and said substantially flat upper surface of said bottom of said container; and (e) a body of viscous fluid contained in said reservoir and being adequate such that at least said substantially flat lower surface of said damping member is submerged thereby; (f) whereby when a mechanical shock is discharged on said object and causes the object to vibrate, the vibration will be transferred to said damping member and cause said substantially flat lower surface of said damping member to move toward said substantially flat upper surface of said bottom of said container, so that said viscous fluid between said substantially flat lower surface of said damping member and said substantially flat upper surface of said bottom of said container is compressed and creates and extremely strong resistance force on said damping member that effectively damps the vibration of said object.

Defined alternatively in detail, the present invention is a weight device, comprising: (a) a generally rectangular shaped container having a top opening opened into a generally rectangular shaped inner chamber defined by a circumferential side surface and a substantially flat bottom surface; (b) a top cover covering said top opening of said container, the cover having an aperture; (c) a generally rectangular shaped load cell placed within said inner chamber of said container and mounted on an elevated step at one of its two ends, such that a main portion of the load cell is suspended and the other one of its two ends is located under said aperture of said top cover; (d) a load adaptor attached on top of said other end of said load cell and extending upwardly through said aperture of said top cover for receiving a load; (e) a damping member having a circumferential side surface and a substantially flat lower surface, the circumferential dimension of the damping member being smaller than the circumferential dimension of said inner chamber; (f) means for attaching said damping member to said load adaptor and said load cell and suspending said damping member within said inner chamber of said container under said load cell, such that said circumferential side surface of said damping member is clear from said circumferential side surface of said inner chamber of said container, but said substantially flat lower surface of said damping member is positioned parallel and very close to said substantially flat bottom surface of said inner chamber of said container, which leaves a very narrow space between said substantially flat lower surface of said damping member and said substantially flat bottom surface of said inner chamber of said container; and (g) a body of viscous fluid contained in said inner chamber of said container such that said damping member is submerged thereby; (h) whereby when the load is discharged on said load adaptor and causes said load cell to vibrate, the vibration will be transferred to said damping member and causes said substantially flat lower surface of said damping member to move downwardly toward said substantially flat bottom surface of said inner chamber of said container, so that said viscous fluid between said substantially flat lower surface of said damping member and said substantially flat bottom surface of said inner chamber of said container is compressed and will create an extremely strong resistance force on said damping member that effectively damps the vibration of said load cell.

Defined broadly, the present invention is a weighing device, comprising: (a) a container having a top opening opened into an inner chamber which has a circumferential side surface and a substantially flat bottom surface; (b) a weight determining member; (c) a damping member having a substantially flat lower surface, the circumferential dimension of the damping member being smaller than the circumferential dimension of said inner chamber; (d) means for attaching said damping member to said weight determining member and suspending said damping member within said inner chamber of said container, such that said substantially flat lower surface of said damping member is positioned parallel and very close to said substantially flat bottom surface of said inner chamber of said container, which leaves a very narrow space between said substantially flat lower surface of said damping member and said substantially flat bottom surface of said inner chamber of said container; and (e) a body of viscous fluid contained in said inner chamber of said container such that at least said substantially flat lower surface of said damping member is submerged thereby; (f) whereby when said weight determining member vibrates and causes said substantially flat lower surface of said damping member to move toward said substantially flat bottom surface of said inner chamber of said container, said viscous fluid between said substantially flat lower surface of said damping member and said substantially flat bottom surface of said inner chamber of said container will be compressed and create an extremely strong resistance force on said damping member that effectively damps the vibration of said weight determining member.

Defined even more broadly, the present invention is a viscous damping apparatus, comprising: (a) a container having an inner chamber; (b) said inner chamber of said container having a substantially flat bottom surface; (c) a damping member having a substantially flat lower surface; (d) means for suspending said damping member, such that said substantially flat lower surface of said damping member is positioned parallel and very close to said substantially flat bottom surface of said inner chamber of said container, which leaves a very narrow space between said substantially flat lower surface of said damping member and said substantially flat bottom surface of said inner chamber of said container; and (e) a body of viscous fluid being enough to fill said very narrow space and forming a very thin layer of viscous fluid therein; (f) whereby when said damping member vibrates and causes said substantially flat lower surface of said damping member to move toward said substantially flat bottom surface of said inner chamber of said container, said very thin layer of said viscous fluid is compressed, which in turn creates an extremely strong resistance force on said damping member that effectively damps the vibration of said damping member.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modification in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A viscous damping apparatus for damping mechanical shocks discharged on an object, comprising:
   a. a container having a circumferential sidewall and a bottom, the circumferential sidewall having an inner surface, and the bottom having a substantially flat upper surface, such that the inner surface of the circumferential sidewall and the substantially flat upper surface of the bottom form a reservoir;
   b. a round disc shaped damping member having a circumferential side surface and a substantially flat lower surface;

c. the circumferential dimension of said damping member being smaller than the circumferential dimension of said reservoir;

d. means for attaching said damping member to said object and suspending said damping member in said reservoir, such that said circumferential side surface of said damping member is clear from said inner surface of said circumferential sidewall of said container, but said substantially flat lower surface of said damping member is positioned parallel and very close to said substantially flat upper surface of said bottom of said container, which leaves a very narrow space between said substantially flat lower surface of said damping member and said substantially flat upper surface of said bottom of said container, the very narrow space being in the range of approximately 60 to 400 mils; and e. a body of viscous fluid contained in said reservoir and being adequate such that at least said substantially flat lower surface of said damping member is submerged thereby and subject to an extremely strong resistance force F which is calculated as $$F = K \frac{R^4 \mu}{(\delta_0 - x)^3} S$$

where K is a proportional constant, R is the radius of said substantially flat lower surface of said damping plate, $\mu$ is the viscosity of the viscous fluid, $\delta_0$ is an initial distance between said substantially flat lower surface of said damping plate and said substantially flat upper surface of said bottom of said container, x is a momentary distance between a current location of said damping member and the initial position $\delta_0$, and S is a speed of said damping member;

f. whereby when a mechanical shock is discharged on said object and causes the object to vibrate, the vibration will be transferred to said damping member and cause said substantially flat lower surface of said damping member to move toward said substantially flat upper surface of said bottom of said container, so that said viscous fluid between said substantially flat lower surface of said damping member and said substantially flat upper surface of said bottom of said container is compressed and creates said extremely strong resistance force on said damping member that effectively damps the vibration of said object.

2. The invention as defined in claim 1 wherein said damping member is generally disc shaped.

3. The invention as defined in claim 1 wherein said means for attaching said damping member to said object and suspending said damping member includes at least one tie bar.

4. The invention as defined in claim 1 further comprising means for preventing said substantially flat lower surface of said damping member from contacting said substantially flat upper surface of said bottom of said container due to an overload discharged on said object.

5. A viscous damping apparatus, comprising:

a. a container having an inner chamber;

b. said inner chamber of said container having a substantially flat bottom surface;

c. a damping member having a substantially flat lower surface;

d. means for suspending said damping member, such that said substantially flat lower surface of said damping member is positioned parallel and very close to said substantially flat bottom surface of said inner chamber of said container, which leaves a very narrow space between said substantially flat lower surface of said damping member and said substantially flat bottom surface of said inner chamber of said container, the very narrow space being less than or equal to 400 mils; and e. a body of viscous fluid being enough to fill said very narrow space and forming a very thin layer of viscous fluid therein to create an extremely strong resistance force F on said damping member, which is calculated as $$F = K \frac{R^4 \mu}{(\delta_0 - x)^3} S$$

where K' is a proportional constant, A is the area of said substantially flat lower surface of said damping member, $\mu$ is the viscosity of the viscous fluid, $\delta_0$ is an initial distance between said substantially flat lower surface of said damping member and said substantially flat bottom surface of said container, x is a momentary distance between a current location of said damping member and the initial position $\delta_0$, and S is a speed of said damping member;

f. whereby when said damping member vibrates and causes said substantially flat lower surface of said damping member to move toward said substantially flat bottom surface of said inner chamber of said container, said very thin layer of said viscous fluid is compressed, which in turn creates said extremely strong resistance force on said damping member that effectively damps the vibration of said damping member.

6. The invention as defined in claim 5 wherein said means for suspending said damping member includes at least one tie bar.

7. The invention as defined in claim 5 further comprising means for preventing said substantially flat lower surface of said damping member from contacting said substantially flat upper surface of said bottom of said container.

* * * * *